United States Patent [19]

Guillerme et al.

[11] Patent Number: 5,120,449
[45] Date of Patent: Jun. 9, 1992

[54] TREATMENT OF AQUEOUS DRILLING MUD EFFLUENTS CONTAINING LIGNOSULFONATES

[75] Inventors: Michel Guillerme, Serrescastet; Pierre Mountetou, Jurancon; Bernard Gastou, Pau, all of France

[73] Assignee: Societe Nationale Elf Aquitaine (Production), Courbevoie, France

[21] Appl. No.: 464,552

[22] Filed: Nov. 27, 1989

Related U.S. Application Data

[63] Continuation of Ser. No. 294,691, filed as PCT/FR88/00154, Mar. 24, 1988, abandoned.

[30] Foreign Application Priority Data

Mar. 27, 1987 [FR] France ................... 87 04271

[51] Int. Cl.⁵ ............................................. C02F 1/56
[52] U.S. Cl. ................................. 210/725; 210/727; 210/735; 210/738; 210/199
[58] Field of Search ............... 210/708, 725, 727, 728, 210/733, 734, 735, 781, 787, 206, 205, 738, 199, 512.1, 259, 908; 175/66

[56] References Cited

U.S. PATENT DOCUMENTS

| | | | |
|---|---|---|---|
| 1,951,647 | 3/1934 | Cooke | 210/512.1 |
| 2,190,596 | 2/1940 | Dorr | 210/738 |
| 3,023,162 | 2/1962 | Fordyce et al. | 210/734 |
| 3,433,312 | 3/1969 | Burdyn et al. | 210/734 |
| 3,737,037 | 6/1973 | Bone, III | 210/734 |
| 4,330,450 | 5/1982 | Lipowski et al. | 210/733 |
| 4,353,803 | 10/1982 | Dover, Jr. | 210/728 |
| 4,482,459 | 11/1984 | Shiver | 210/725 |

FOREIGN PATENT DOCUMENTS

| | | | |
|---|---|---|---|
| 1012265 | 6/1977 | Canada | 210/724 |
| 54-113954 | 2/1978 | Japan | 210/734 |
| 63-267408 | 4/1987 | Japan | 210/734 |

Primary Examiner—Peter Hruskoci
Attorney, Agent, or Firm—Oblon, Spivak, McClelland, Maier & Neustadt

[57] ABSTRACT

Method for treating drilling effluents containing lignosulfonates wherein, successively, sulfuric acid is injected in order to cause coagulation, a cationic polyelectrolyte is injected to cause a flocculation and solids are separated from the liquid by centrifugation or dewatering compaction.

5 Claims, 2 Drawing Sheets

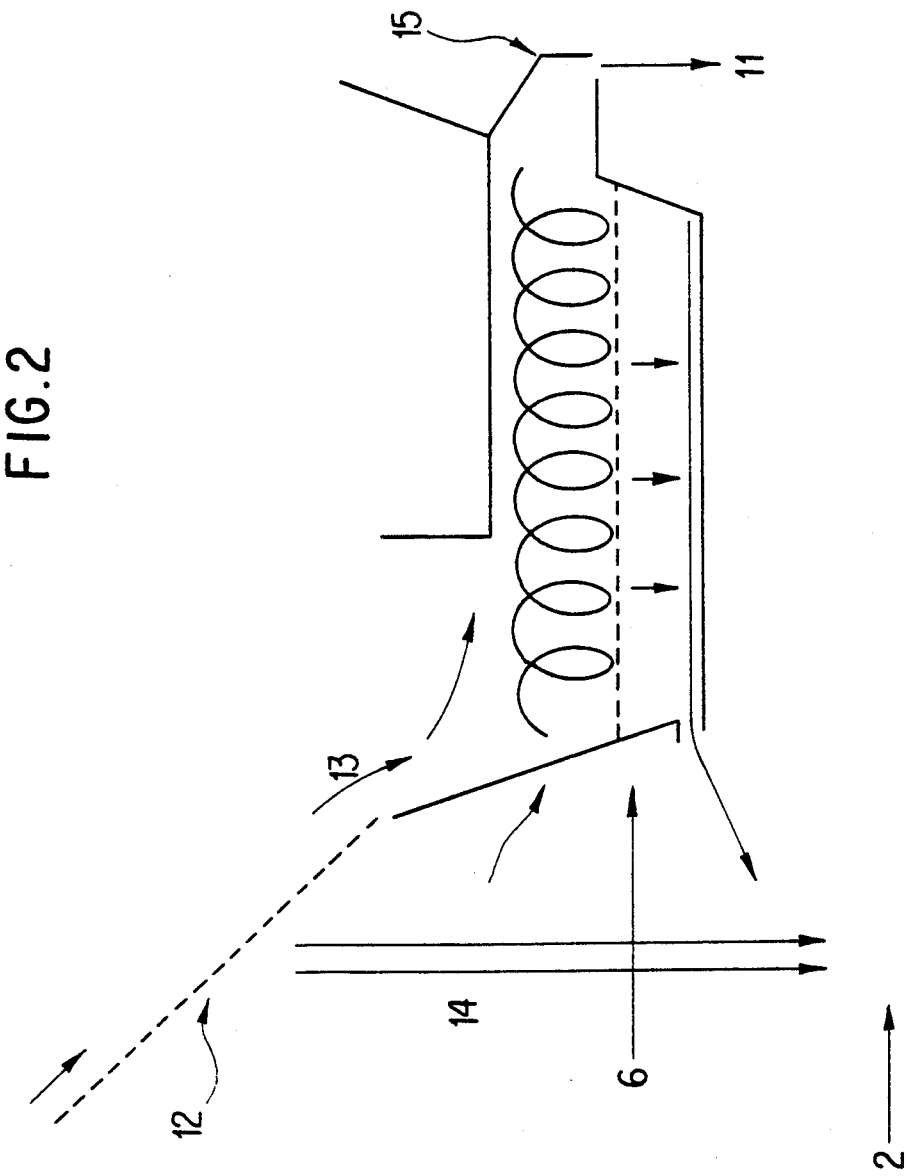

TREATMENT OF AQUEOUS DRILLING MUD EFFLUENTS CONTAINING LIGNOSULFONATES

This application is a continuation of application Ser. No. 07/294,691, filed as PCT/FR88/00154, Mar. 24, 1988, now abandoned.

BACKGROUND OF THE INVENTION

The present invention relates to a process for treating spent discharge water, and an apparatus to practice the method. It is particularly applicable for the treatment of the water from mud used for drilling for hydrocarbons.

DISCUSSION OF BACKGROUND

The drilling muds contain at the same time mineral materials, particularly clays, carbonates of calcium, magnesium and metal alkaline earths, and sulfates (gypsum), and soluble organic materials and dispersions, in particular ligno-sulfonates, bio-polymers and carboxy-methyl-cellulose. With 30 to 230 Kg. of solid materials per cubic meter, the density of the mud has a value between 1.03 and 1.14.

These drilling effluents are essentially composed of drilling mud diluted by wash water, which cannot be discharged into a river without treatment.

The essential parameters which regulate authorization for discharge are the color, the odor, the chemical oxygen demand (COD), the biological oxygen demand (BOD), the materials in suspension (MES), the dissolved salts, the content of hydrocarbons, and last the toxicity.

The ligno-sulfonates are employed for the treatment of the muds and act at the same time as dispersants and inhibitors of swelling of clays, reducer of filtrate and improver of cake, resistance to high concentrations of calcium and NaCl and to high temperatures, and are active on the color which varies from maroon to black and on the COD which increases significantly.

The various treatments which have been proposed, in general, include acidification destined to cause precipitation of the mineral materials and an addition of specific products suitable to cause separation of organic materials.

For the effluents of paper pulp mills, U.S. Pat. No. 4,459,228 HAARS recommends acidification with hydrochloric acid which is well suited for treatment of effluents of low mineral content and causes a lowering of pH below 6 favoring the following step which consists of addition of polycations, particularly polyamines, well suited to eliminate the Lignosulfates in a hydrochloric medium.

The drilling muds according to the French application number 2,205,485 ERAP are advantageously acidified with sulfuric acid, which cause precipitation as sulfates of the large charge of mineral materials. The addition later of alkaline compounds or alkaline earths is proposed for eliminating the ligno-sulfonates. This last step does not, in all cases work correctly.

Another treatment, actually practiced, based on anionic coagulation flocculation in a single step, does not efficiently eliminate the lignosulfonates.

The new process avoids this disadvantage by effecting successive and separate coagulation an flocculation, using a specific product, which permits control and completion of each step.

SUMMARY OF THE INVENTION

A process according to the invention for the treatment of aqueous effluents having a high content of mineral materials and containing lignosulfonates, such as drilling muds, comprises the steps of injecting sulfuric acid to cause coagulation, then adding a cationic poly-electrolyte to cause flocculation, and then mechanical separation of the liquid and solid phases.

Such a process is characterized in that the cationic poly-electrolyte is a water soluble polymer containing at least 40% of repeating patterns each bearing at least one quaternary ammonium group. The minimum proportion of 40% is generally by weight.

BRIEF DESCRIPTION OF THE DRAWINGS

FIG. 2 shows a draining-compactor apparatus.

DETAILED DESCRIPTION OF THE PREFERRED EMBODIMENTS

Figure 1:
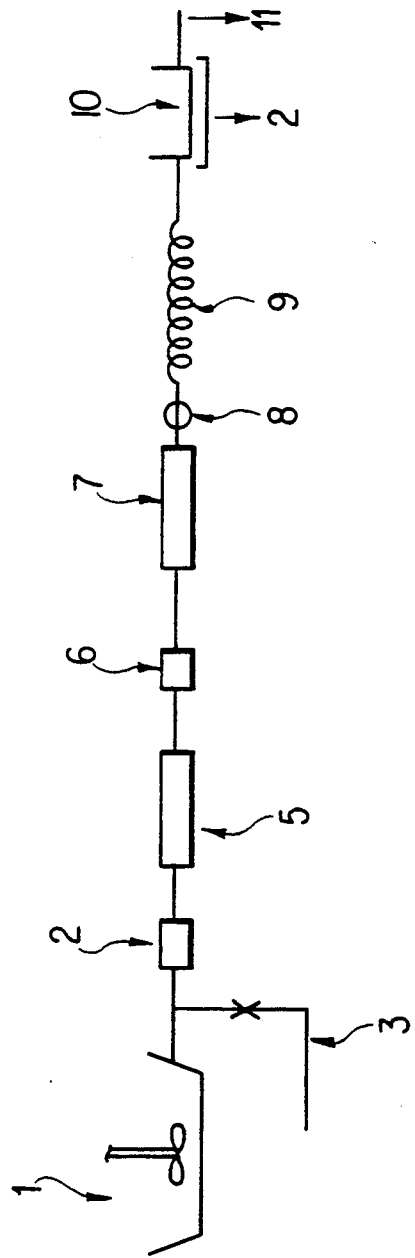
FIG. 1 shows a schematic of the apparatus of the present invention.

According to a preferred embodiment, the recurrent pattern bearing at least one quaternary ammonium group is an acrylate derivative pattern, and of the formula:

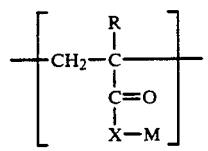

in which X is O or N, R is H or $CH_3$ and M is the quaternary ammonium radical:

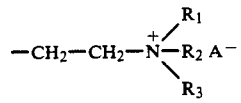

where $A^-$ is an anion compatible with $N^+$ and where $R_1$ $R_2$ $R_3$ are $C_{1-4}$ hydrocarbon groups.

In such a process, the anion $A^-$ compatible with N is selected from among the following: $Cl^-$, $Br^-$, $CH_3SO_4^-$.

Preferably, the $C_{1-4}$ hydrocarbon groups designated $R_1$ $R_2$ $R_3$ are selected from among alkyl groups having 1-4 Carbon atoms.

In such process, the recurrent patterns bearing at least one quaternary ammonium group have in addition, in complement, the acrylamide pattern:

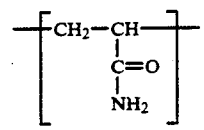

In the same manner, it is advantageous to select as the radical M a remainder of quaternary ammonium of the formula:

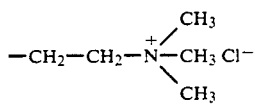

In different circumstances of the process, it is desirable after having injected the sulfuric acid and mixing the sulfuric acid well with the effluent, to control the mean pH of the effluent by adding that which is necessary to maintain the pH between 5 and 6.

Similarly, after having injected a cationic poly-electrolyte and mixing well, it is advantageous to maintain the contact between said poly-electrolyte and the effluent for a time sufficiently long for which the flocculation is effective, before performing the mechanical separation.

An apparatus according to the invention for the treatment of the drilling effluents containing ligno-sulfonates, comprises successively, in a treatment line, means:
for injection of sulfuric acid,
for mixing of this acid with the effluent,
for control of pH and to maintain the pH lower than 6,
for injection of a cationic poly-electrolyte,
for mixing of the poly-electrolyte with the effluent,
for maintaining the poly-electrolyte in the presence of
the effluent by using a flocculation tank of a length sufficient, as determined as a function of flow, and lastly,
for separation of the solid and liquid phases.

Among the different means for mixing of the poly-electrolyte and the effluent, a fixed helicoidal ramp coaxial with the treatment line has been used with success.

In the apparatus considered as the most satisfactory, the flocculation tank used has a length of at least twenty five meters.

According to a preferred embodiment, the means for separating the solid and liquid phases are constituted by a centrifuge.

The invention will be better comprised in the following description, given as a non limiting example, of an apparatus, for practicing the proposed process, and illustrated in the attached drawings.

FIG. 1 : Schematic of the installation.
FIG. 2 : Draining-compactor apparatus.

FIG. 1 schematically shows a treatment line basin 1 for mud to be discharged to an exterior drain 2 such as a river for the water, and a discharge 11 for the pelletable solid phase.

On this line there is shown successively:
an inlet conduit 3 for fresh water for eventual dilution,
an injection device 4 for injecting dilute sulfuric acid as necessary,
a static mixer 5, a helicoidal device, coaxially of the conduit, causing increased local speed and turbulence favoring the mixing,
a device 6 for controlling the pH,
a device 7 for injection of poly-electrolyte,
a mixer 8,
a flocculation tank 9, constituted by a tube of significant length, and at least 25 meters in a serpentine form for reducing the weight and favoring contact,
finally, apparatus 10 for solid liquid separation with a separate outlet 2 for the removal of water, and an outlet 11 for the solid phase or muds. The device 10 can be a centrifuge. It can also be constituted by a draining compactor such as is shown at FIG. 2.

FIG. 2 shows a draining-compactor comprised of two parts: a grid 12 inclined at least 45° to the vertical on which the effluent flocculate slides to separate into free water which passes through and goes to the discharge 2 and into floccule elements 13, and a screw compactor 14, toward which the floccule elements 13 slide by gravity, and which deliver at its extremity 15 a pelletable effluent 11 when the water traverses a grill of bottom 16 which can also be oriented toward the discharge 2.

EXAMPLE OF OPERATION OF THE APPARATUS

The mud treated is bentonitic with ligno-sulfonates with a density $d=1.04$ to $1.05$ and a treatment flow of 3 $m^3$/hour.

The treatment of such mud with 0.75 Kg of poly-electrolyte per m3 shows the changes of characteristics indicated below:
the COD passes from 3.240 to 1.00–1.300,
the MES in mgr/liter from 40.000 to 200–700,
the ligno-sulfonates in g/liter from 2.80 to 1–1.4,
the pH remains stable between 5 and 6,
the chlorides remain stable at 1.07 when they are increasing with the anionic treatment,
the brown-blackish color becomes straw yellow clear.

Acidification with $H_2SO_4$ is less burdensome than with HCl and eliminates an appreciable fraction of the $Ca++$ ions, which makes the residual water more usable for making fresh mud.

We claim:

1. A process for treating an aqueous drilling mud effluent, containing minerals and lignosulfonates, to remove the lignosulfonates, comprising the steps of:
  (a) adding sulfuric acid to said aqueous effluent to cause coagulation,
  (b) mixing the sulfuric acid with said effluent while controlling the mean pH of the effluent/sulfuric acid mixture to a pH between 5–6,
  (c) flocculating the aqueous effluent containing sulfuric acid at said pH by adding thereto a cationic polyelectrolyte water soluble polymer comprised of at least 40% of monomer units containing at least on quaternary ammonium group wherein said monomer unit has the formula:

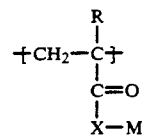

wherein X i O or N, R is H or $CH_3$, M is a quaternary ammonium group of the formula:

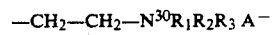

wherein A is an anion compatible with said quaternary ammonium group, and $R_1$, $R_2$ and $R_3$ are $C_{1-4}$ hydrocarbon groups, to form a liquid phase and a solid phase, and
  (d) mechanically separating the liquid phase and solid phase.

2. The process of claim 1, wherein said polymer further comprises monomers of the formula:

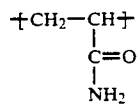
3. The process of claim 1, wherein said anion is selected from the group consisting of $Cl^-$, $Br^-$ and $CH_3SO_4^-$.
4. The process of claim 1, wherein $R_1$, $R_2$ and $R_3$ are $C_{1-4}$ alkyl groups.
5. The process of claim 1, wherein M is the group $CH_2CH_2N(CH_3)_3^+Cl^-$.
* * * * *

UNITED STATES PATENT AND TRADEMARK OFFICE
CERTIFICATE OF CORRECTION

PATENT NO. : 5,120,449
DATED : June 9, 1992
INVENTOR(S) : Guillerme et al

It is certified that error appears in the above-indentified patent and that said Letters Patent is hereby corrected as shown below:

On the title page, items [75], [63] and [30], should read as follows:

--[75] The second inventors name should be --Pierre Mounetou--.

[63]    Related U.S. Application Data
    Continuation of Ser. No. 294,691, Nov. 28, 1988, abandoned.

[30]    Foreign Application Priority Data
    PCT/FR88/00154    Mar. 24, 1988
    Mar. 27, 1987    [FR]    France...............87 04271 --

In column 1, lines 4-6, should read --This application is a continuation of application Ser. No. 07/294,691, filed Nov. 28, 1988, abandoned.--.

Signed and Sealed this

Twenty-eighth Day of September, 1993

Attest:

BRUCE LEHMAN

Attesting Officer        Commissioner of Patents and Trademarks